UNITED STATES PATENT OFFICE.

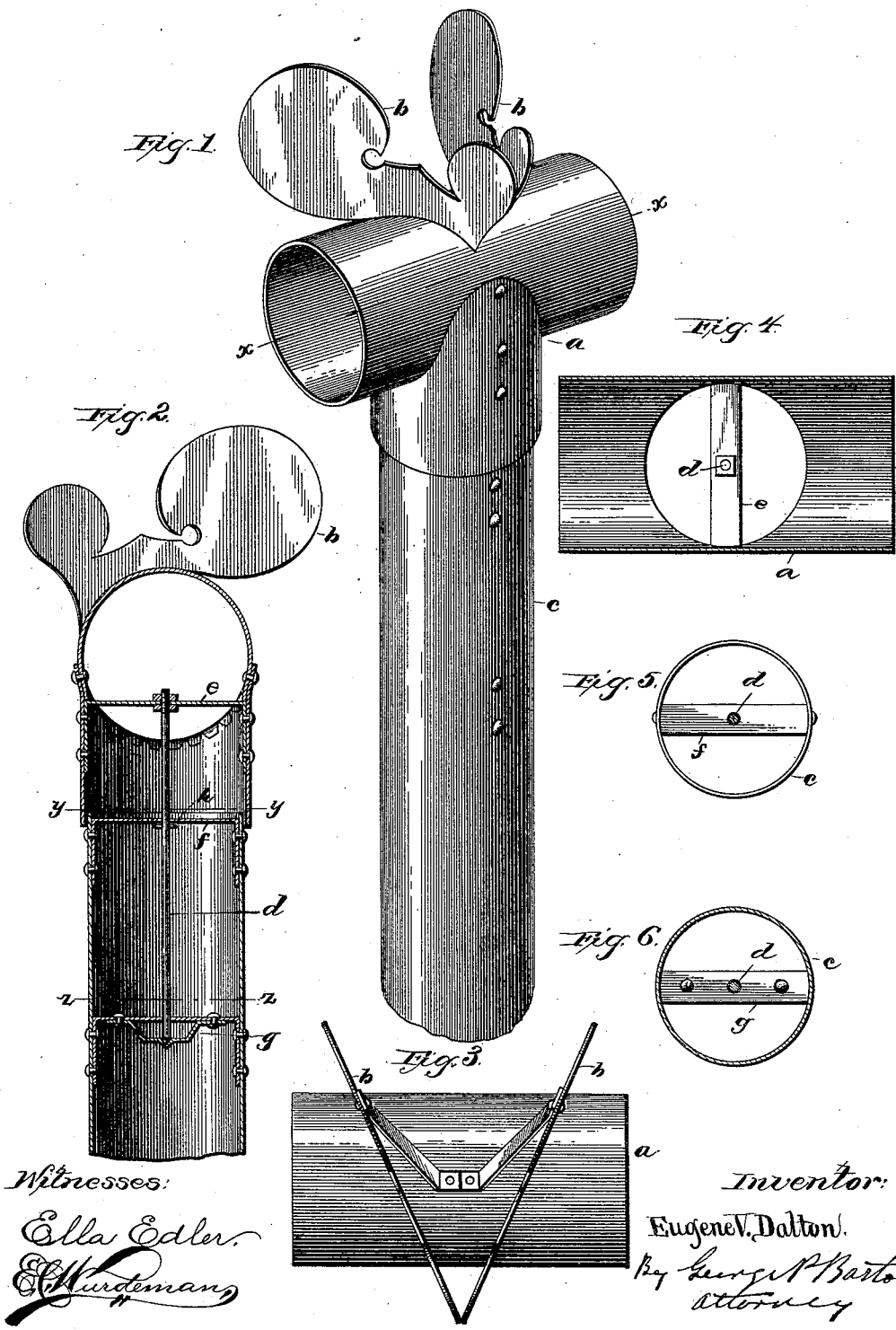

EUGENE V. DALTON, OF CHICAGO, ILLINOIS; EDWARD S. FRASHER AND LUCY R. DALTON ADMINISTRATORS OF SAID EUGENE V. DALTON, DECEASED.

WHIRLING TOP FOR SMOKE-STACKS.

SPECIFICATION forming part of Letters Patent No. 453,465, dated June 2, 1891.

Application filed August 5, 1890. Serial No. 361,103. (No model.)

*To all whom it may concern:*

Be it known that I, EUGENE V. DALTON, a citizen of the United States, residing at Chicago, in the county of Cook and State of Illinois, have invented a certain new and useful Improvement in Whirling Tops for Smoke-Stacks, of which the following is a full, clear, concise, and exact description, reference being had to the accompanying drawings, forming a part of this specification.

My invention relates to whirling tops for smoke-stacks or chimneys; and its object is to improve the draft by causing the T-top to always stand sidewise to the wind.

My invention is specially designed for use upon chimneys near high buildings, or upon chimneys which are so placed as to be liable to downward gusts of wind or currents of air.

My invention consists, essentially, in a pivotally-mounted T provided with wings or vanes placed substantially at right angles to the direction of the T, which shall always cause the T to turn as the wind shifts, so as to present a particular side thereof to the wind.

My invention further consists in the manner of mounting the wings upon the T and the details of construction for mounting the rotary top upon the chimney or upper end of the smoke-stack.

My invention will be readily understood by reference to the accompanying drawings, in which—

Figure 1 is a perspective view of a rotary chimney-top embodying my invention. Fig. 2 is a sectional view thereof. Fig. 3 is a plan view showing the manner of bracing the wings. Fig. 4 is a view upon line $xx$ of Fig. 1, showing the manner of connecting the pivotal standard with the T. Fig. 5 is a plan of the upper end of the upper joint of the smoke-stack, as seen from line $yy$ of Fig. 2. Fig. 6 is a sectional view upon line $zz$.

Like parts are indicated by similar letters of reference throughout the different figures.

The rotary T-piece $a$ is provided, preferably, upon the top with the two wings $b\ b$. These wings may be soldered or otherwise secured in place and are preferably braced, as indicated in Fig. 3. These wings, constructed and arranged as shown, will always point at their common edge toward the wind. No matter whether the wind may come in gusts or slanting downwardly, the wings will perform their function of acting as vanes to cause the side of the T-piece to stand against the wind, and the wind blowing across the ends of the T acts in the proper direction to increase the draft up the chimney. The T-piece is supported in position above the upper joint $c$ upon the pivotal standard $d$, this pivotal standard being rigidly secured to the cross-piece $e$ of the T in any suitable manner, preferably as shown in Figs. 2 and 4. This standard $d$ is passed through a hole provided in the brace $f$, and its lower end rests in a socket $g$. A pin $h$, passing through the standard below the brace $f$, prevents the standard from being raised out of its socket. The lower portion of the T passes over the upper open end of the joint $c$, as shown, thus making the flue continuous up through the T. The T thus passing over the end of the joint $c$ aids the pivotal standard in holding the T upright.

Having thus described my invention, I claim as new and desire to secure by Letters Patent—

1. The combination, with the rotary T-piece, of the wings $b$, placed substantially at right angles to the direction of the T and separated at their rear portions, whereby their common edge or front portion will be always maintained toward the wind to hold a particular side of the T-piece toward the wind, substantially as and for the purpose specified.

2. The combination, with the rotary T-piece, of wings $b$, secured rigidly to the top of the same, said wings being separated at their rear and coming together at their front portion, and each being set at the same angle to the upper portion of the T, whereby the side of the T-piece is held toward the wind to cause the wind to pass over the open ends of the T-piece to increase the draft, substantially as and for the purpose specified.

3. The T-piece pivotally mounted upon a standard having its bearings in the upper portion of the smoke-stack, the lower portion of the T passing over the upper end of the upper joint of the smoke-stack, as described, in combination with wings secured upon the top of the T-piece, said wings being braced and held in permanent position and adapted to act as vanes to hold a particular side of the T-piece toward the wind, substantially as and for the purpose specified.

4. The combination, with the T-piece, of the pivotal standard $d$, rigidly secured to the cross-piece $e$, said standard passing through a hole provided in the brace $f$ and its lower end resting in the socket $g$ below, and a pin $h$ passing through the standard below the brace $f$ to prevent the standard from being raised out of its socket, the lower portion of the T passing over the upper open end of the joint $c$, said T being provided with wings upon the upper portion thereof to cause the T to always present a particular side to the wind, substantially as and for the purpose specified.

In witness whereof I hereunto subscribe my name this 2d day of August, A. D. 1890.

EUGENE V. DALTON.

Witnesses:
GEORGE P. BARTON,
ELLA EDLER.